United States Patent
Nakamura et al.

(10) Patent No.: US 8,565,751 B2
(45) Date of Patent: Oct. 22, 2013

(54) MOBILE COMMUNICATION METHOD, RADIO CONTROL STATION, AND RADIO BASE STATION

(75) Inventors: Yuichiro Nakamura, Zushi (JP); Masafumi Masuda, Yokosuka (JP); Takaaki Sato, Kawasaki (JP); Takanori Utano, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 482 days.

(21) Appl. No.: 12/741,991

(22) PCT Filed: Nov. 7, 2008

(86) PCT No.: PCT/JP2008/070344
§ 371 (c)(1),
(2), (4) Date: Nov. 1, 2010

(87) PCT Pub. No.: WO2009/060956
PCT Pub. Date: May 14, 2009

(65) Prior Publication Data
US 2011/0059742 A1    Mar. 10, 2011

(30) Foreign Application Priority Data
Nov. 8, 2007    (JP) .................................. 2007-291009

(51) Int. Cl.
*H04W 36/00*    (2009.01)
*H04W 4/00*    (2009.01)

(52) U.S. Cl.
USPC .......................... 455/422.1; 455/436; 371/331

(58) Field of Classification Search
USPC .................................... 455/525, 436; 370/331
See application file for complete search history.

(56) References Cited

U.S. PATENT DOCUMENTS

2006/0128386 A1* 6/2006 Ohtani et al. ................. 455/436
2007/0026887 A1   2/2007 Voyer et al.

FOREIGN PATENT DOCUMENTS

| | | |
|---|---|---|
| CN | 1688175 A | 10/2005 |
| JP | 2003-224875 | 8/2003 |
| JP | 2007-089135 | 4/2007 |

OTHER PUBLICATIONS

Office Action issued Sep. 5, 2012, in Chinese Patent Application No. 200880115435.3 with English translation.

* cited by examiner

*Primary Examiner* — George Eng
*Assistant Examiner* — Nizar Sivji
(74) *Attorney, Agent, or Firm* — Oblon, Spivak, McClelland, Maier & Neustadt, L.L.P.

(57) ABSTRACT

A mobile communication method according to the present invention includes a step A of offering a particular service through a second radio data link established between a mobile station and a cell in the second area in a state in which a first radio data link is not established between the mobile station and a cell in the first area and a step B of suspending the offer of the particular service through the second radio data link when the state in which the first radio data link is not established continues for a predetermined time period.

7 Claims, 11 Drawing Sheets

MOBILE COMMUNICATION METHOD, RADIO CONTROL STATION, AND RADIO BASE STATION

CROSS-REFERENCE TO RELATED APPLICATIONS

This application is a National Stage of Japanese Application PCT/JP08/070,344 filed Nov. 7, 2008, and claims the benefit of priority under 35 U.S.C. §119 of Japanese Application No. 2007-291009, filed Nov. 8, 2007, the entire contents of which are incorporated herein by reference.

TECHNICAL FIELD

The present invention relates to a mobile communication method, a radio control station, and a radio base station in a mobile communication system having a first area and a second area.

BACKGROUND ART

In recent years, 3GPP (3rd Generation Partnership Projects) has specified a mobile communication system employing a "W-CDMA (Wideband-Code Division Multiple Access) scheme or UMTS (Universal Mobile Telecommunications System) scheme" based on CDMA (Code Division Multiple Access) techniques.

A mobile communication system of the W-CDMA scheme includes a "DHO (diversity hand over) function" as a radio layer protocol function.

The DHO function is a function to allow a mobile station (UE: user equipment) to perform communication through a radio data link established with multiple cells managed by a radio base station, and to achieve maximization of a gain and stabilization of communication by using a maximum ratio combining process, a selection combining process, and the like of received data.

Here, a radio control station is configured to perform such a control as to disconnect a radio data link established between a cell having deteriorated communication quality and the mobile station UE on the basis of a request from the mobile station UE, or on the other hand, to add a radio data link between a cell having a good communication quality and the mobile station UE on the basis of a report from the mobile station UE.

Moreover, in the mobile communication system of the W-CDMA scheme, the radio control station not only performs the above-described control at the time of movement of the mobile station UE but also starts communication between the mobile station UE and multiple cells having a good communication quality in a DHO state when a communicate is possible between the mobile station UE and the multiple cells having a good communication quality. Thereby, radio resources can be used effectively.

Figure 1:
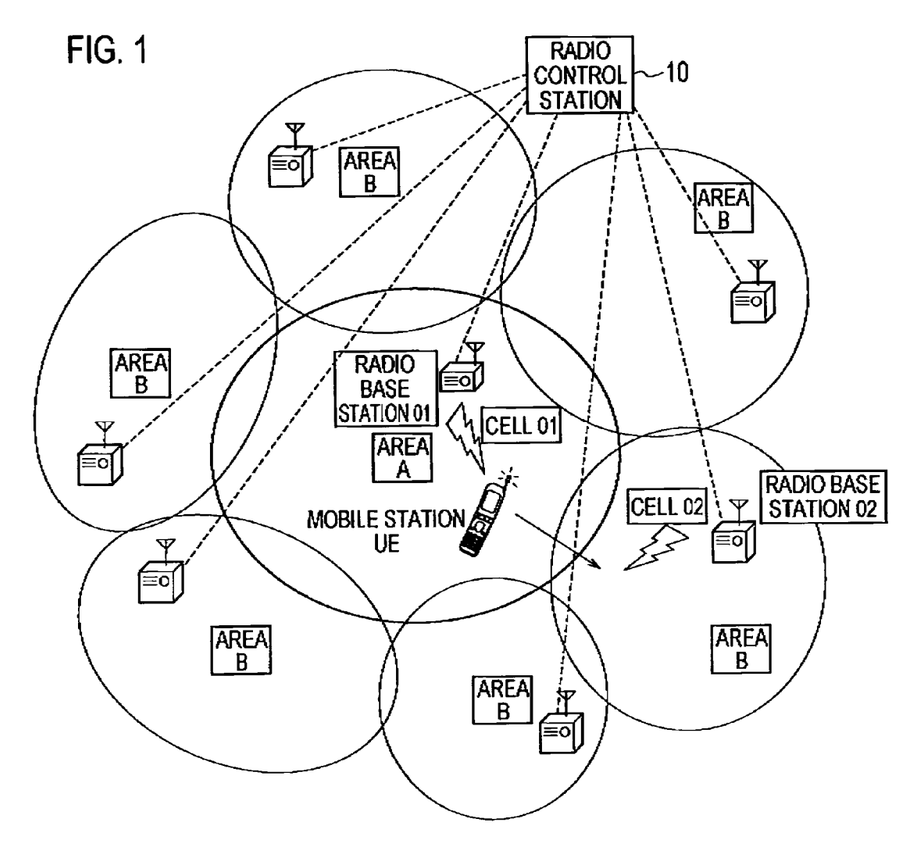
FIG. 1 is an overall configuration diagram of a mobile communication system according to a first embodiment of the present invention.

As shown in FIG. 1, there has heretofore been known a mobile communication system in which multiple areas A and B are formed by multiple radio base stations 01 and 02 and a radio control station 10, and a particular service is offered in the area A.

For example, according to the above-described communication system, a particular service such as a flat-rate communication service for a specific contracted user is offered in the area A.

However, according to the above-described mobile communication system, if the mobile station UE moves out of the area A, then it is not possible to continue to offer the particular service in the DHO state to the mobile station UE unless the same particular service as in the area A is offered in an adjacent area (hereinafter referred to as the area B) to the area A.

For this reason, in general, when the radio control station receives a branch addition request from the mobile station UE while a particular service is offered (such as an extension communication service) to the mobile station UE through a certain radio data link (hereinafter referred to as a branch), the radio control station is forced to execute such a control as to suspend the offer of the particular service to the mobile station UE if the particular service cannot be offered via the branch involved in the branch addition request.

As a result, it is assumed likely that interference of the area B at an edge of the area A causes the branch addition request concerning a cell in the area B to be transmitted from the mobile station UE. If the area B is the area which does not offer the particular service, then it is likely that the mobile station UE cannot continue to use the particular service, even through the mobile station UE is located in the area A.

Meanwhile, if the mobile station UE also establishes the branch with the cell in the area B being the area not offering the particular service (the branch which cannot offer the particular service) when starting communication concerning the particular service in the area A being the area offering the particular service, then the mobile station UE is unable to use the particular service. Therefore, broad coverage of the area offering the particular service cannot be ensured.

Here, for example, in order to maintain continuity of communication concerning the particular service even at the edge of the area A offering the particular service, the same particular service needs to be offered in the area B which is adjacent to the area A being the area offering the particular service.

As a result, it is possible to reduce an effect of the interference with the adjacent area B at the edge of the area A offering the particular service, and to allow the mobile station UE to use the particular service in the DHO state.

As described above, according to the conventional mobile communication system, the area offering the particular service becomes too broad when the adjacent area to the area offering the particular service is also configured to offer the same particular service, and an operating company cannot limit the area offering the particular service within an originally intended area (such as an indoor area). Hence the conventional mobile communication system has a problem that there is a possibility of causing pressure on a communication capacity attributable to an increase in communication related to the particular service in an area outside the area originally intended by the operating company (such as an entire outdoor area).

Moreover, the conventional mobile communication system has a possibility to cause a difference related to the broad coverage of the area offering the particular service or a temporal change of the area offering the particular service for each mobile station UE depending on a difference in the configuration of each area offering the particular service or on a change of the area offering the particular service. Since the operating company cannot control these factors, there is a problem that a service quality of the particular service may be impaired.

DISCLOSURE OF THE INVENTION

Accordingly, the present invention has been made in view of the above-described problems and an object thereof is to provide a mobile communication method, a radio control station, and a radio base station, which are capable of avoiding pressure on a communication capacity of an area adjacent to an area offering a particular service and avoiding deterioration in a service quality attributable to a difference in a configuration of each area offering the particular service or a change of the area offering the particular service.

The first feature of the present invention relates to a mobile communication method for a mobile communication system having a first area and a second area. The method includes a step A of offering a particular service through a second radio data link established between a mobile station and a cell in the second area in a state in which a first radio data link is not established between the mobile station and a cell in the first area and a step B of suspending the offer of the particular service through the second radio data link when the state in which the first radio data link is not established continues for a predetermined time period.

In the first feature of the present invention, the method may include a step of activating a timer configured to count the predetermined time period when the first radio data link is not established at a start of communication concerning the particular service by the mobile station and the offer of the particular service through the second radio data link may be suspended in the step B when the timer expires.

In the first feature of the present invention, the method may include a step of resetting the timer when the first radio data link is established.

In the first feature of the present invention, the method may include a step of activating the timer when transition to the state in which the first radio data link is not established occurs in the course of the communication concerning the particular service.

The second feature of the present invention relates to a radio control station used in a mobile communication system having a first area and a second area. The mobile communication system includes a particular service offering unit configured to offer the particular service through a second radio data link established between a mobile station and a cell in the second area in a state in which a first radio data link is not established between the mobile station and a cell in the first area and the particular service offering unit is configured to suspend the offer of the particular service through the second radio data link when the state in which the first radio data link is not established continues for a predetermined time period.

In the second feature of the present invention, the mobile communication system may include a timer controller configured to activate a timer to count the predetermined time period when the first radio data link is not established at a start of communication concerning the particular service by the mobile station and the service offering unit is configured to suspend the offer of the particular service through the second radio data link when the timer expires.

In the second feature of the present invention, the timer controller may be configured to reset the timer when the first radio data link is established.

In the second feature of the present invention, the timer controller may be configured to activate the timer when transition to the state in which the first radio data link is not established occurs in the course of the communication concerning the particular service.

The third feature of the present invention relates to a radio base station to be used in a mobile communication system having a first area and a second area. The radio base station includes a particular service offering unit configured to offer the particular service through a second radio data link established between a mobile station and a cell in the second area in a state in which a first radio data link is not established between the mobile station and a cell in the first area and the particular service offering unit is configured to suspend the offer of the particular service through the second radio data link when the state in which the first radio data link is not established continues for a predetermined time period.

BEST MODE FOR CARRYING OUT THE INVENTION

Configuration of Mobile Communication System According to First Embodiment of the Present Invention A configuration of a mobile communication system according to a first embodiment of the present invention will be described with reference to FIG. 1 to FIG. 3.

As shown in FIG. 1, a mobile communication system according to this embodiment includes radio base stations 01 and 02 provided with a radio communication function, and a radio control station 10 connected to the radio base stations 01 and 02 and configured to perform a radio control operation.

It is to be noted that the mobile communication system generally includes multiple hierarchical exchanges and a device such as a home memory for storing subscriber information. However, description and explanation thereof will be omitted in this specification.

Meanwhile, as shown in FIG. 1, the mobile communication system according to this embodiment is capable of offering an identical particular service (such as a flat-rate communication service for a specific contracted user) in both of an area A and an area B and maintaining broad coverage of areas offering the particular service. Therefore, when the mobile station UE is located in any of the area A and the area B, the mobile station UE can use the particular service in a DHO state as long as a first radio data link is established between the mobile station UE and a cell (such as a cell 01) in the area A (a first area).

Figure 2:
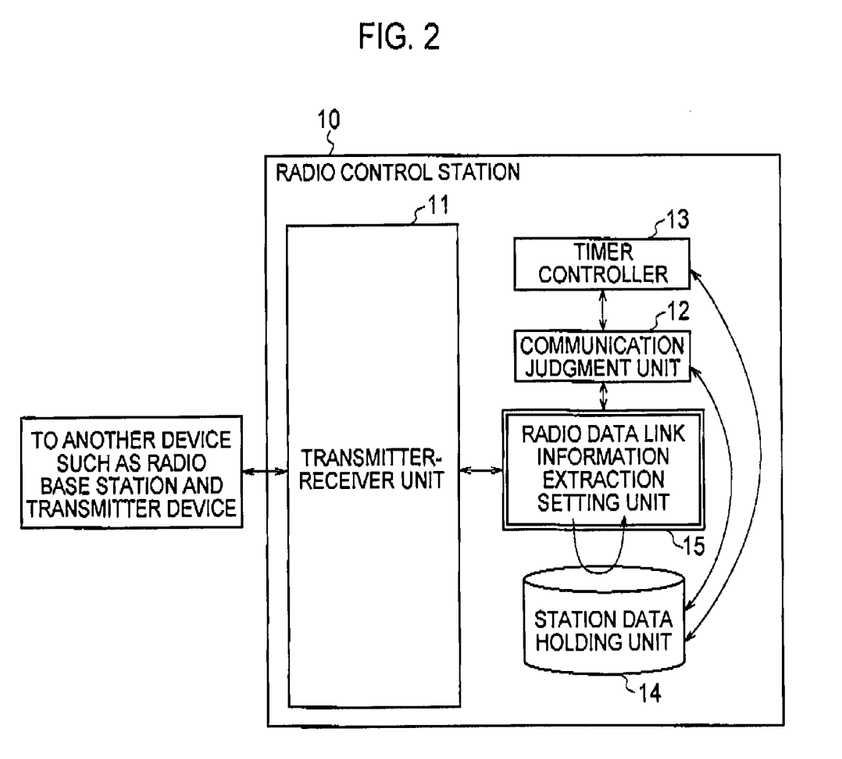
FIG. 2 is a functional block diagram of a radio control station according to the first embodiment of the present invention.

As shown in FIG. 2, the radio control station 10 according to this embodiment includes a transmitter-receiver unit 11, a communication judgment unit 12, a timer controller 13, a station data holding unit 14, and a radio data link information extraction setting unit 15. It is to be noted that the radio control station 10 includes various other functioning units. However, explanation thereof will be omitted in this specification.

The radio data link information extraction setting unit 15 is configured to perform set-up processing, modification processing, deletion processing, and the like of a radio data link.

To be more precise, the radio data link information extraction setting unit 15 is configured to perform deletion (disconnection) processing of a second radio data link in response to an instruction from the communication judgment unit 12.

The timer controller 13 is configured to perform such a control as to activate or reset a timer for counting a predetermined time period (a timer value).

To be more precise, the timer controller 13 is configured to activate the timer when the first radio data link is not established between the mobile station UE and a cell (such as the cell 01) in the area A (the first area) (i.e., when such a fact is notified from the radio data link information extraction setting unit 15) at the start of communication concerning the particular service with the mobile station UE.

Moreover, the timer controller 13 is configured to reset the timer when the above-described first radio data link is established (i.e., when such a fact is notified from the radio data link information extraction setting unit 15).

Further, the timer controller 13 is configured to activate the timer in the case of transition to a state in which the above-described first radio data link is not established in the course of communication concerning the particular service (when a fact of executing the deletion processing of the first radio data link, the modification processing from the first radio data link to the second radio data link, or the like is notified from the radio data link information extraction setting unit 15, for example).

The communication judgment unit 12 is configured to judge appropriateness to continue the communication concerning the particular service through the second radio data link, or namely, as to whether or not it is appropriate to continue the offer of the particular service through the second radio data link, depending on the timer controlled by the timer controller 13 and on station data held by the station data holding unit 14 such as information on a cell in communication.

Moreover, when the state in which the first radio data link is not established continues for a predetermined time period, the communication judgment unit 12 instructs the transmitter-receiver 11 to suspend the offer of the particular service through the second radio data link and instructs the radio data link information extraction setting unit 15 to delete (disconnect) the second radio data link.

To be more precise, when the timer for counting the above-described predetermined time period expires (i.e., when the timer controller 13 detects expiration of the timer used for counting), the communication judgment unit 12 instructs the transmitter-receiver unit 11 to suspend the offer of the particular service through the second radio data link and instructs the radio data link information extraction setting unit 15 to delete (disconnect) the second radio data link.

The station data holding unit 14 is configured to hold station data including data to be used for the judgment by the communication judgment unit 12, timer values, and the like for each of the areas managed by the radio control station.

Figure 3:
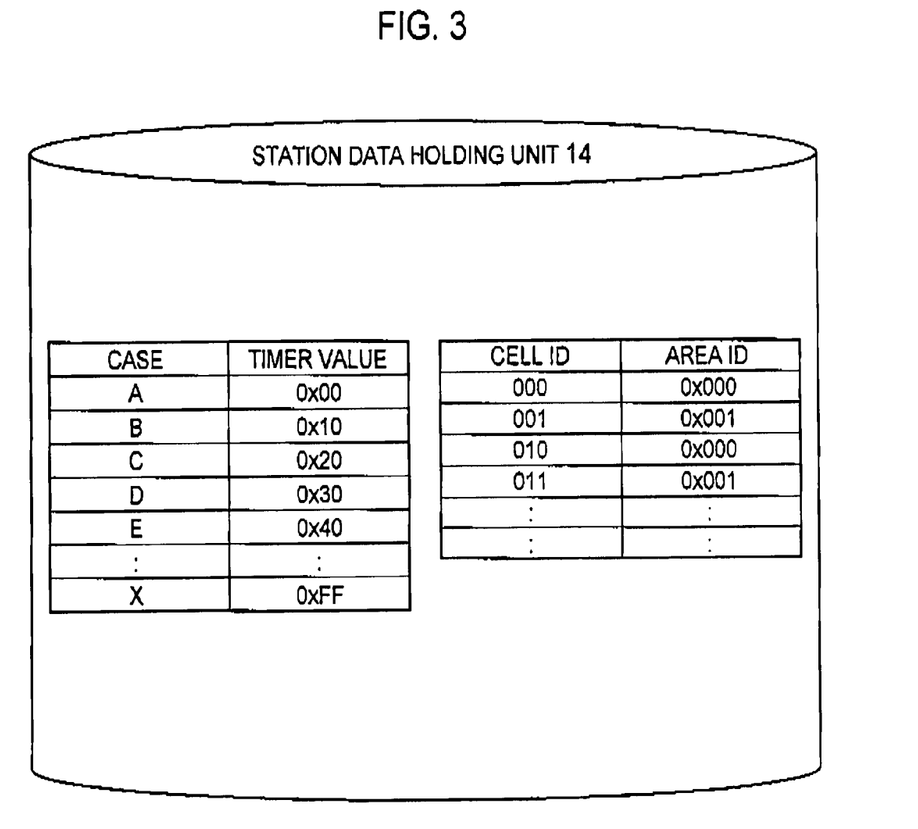
FIG. 3 is a view showing an example of internal data to be held by a station data retention unit of the radio control station according to the first embodiment of the present invention.

As shown in FIG. 3, the station data holding unit 14 holds timer values depending on respective cases and is able to return a time value corresponding to a designated case.

For example, assuming that a case of being barely influenced by the area B is defined as a "case A", the station data holding unit 14 returns a timer value "00x0" when the "case A" is designated. In this way, the station data holding unit 14 is configured to return a timer value corresponding to each case depending on the influence from the area B.

Here, assuming that a case of turning off the timer is defined as a "case X", the station data holding unit 14 is configured to return a timer value "0xFF" when the "case X" is designated.

Meanwhile, as shown in FIG. 3, the station data holding unit 14 is configured to hold links of "cell IDs" and "area IDs" in association with each other, and to return an "area ID" corresponding to a designated "cell ID".

In the example of FIG. 3, an area ID "0x000" is assumed to correspond to the "area A" while an area ID "0x001" is assumed to correspond to the "area B".

The transmitter-receiver unit 11 is configured to perform transmission and reception of data between the mobile station UE and the radio base station.

To be more precise, the transmitter-receiver unit 11 is configured to offer the particular service to the mobile station UE through the first radio data link, which is established between the mobile station UE and a cell in the area A.

Meanwhile, the transmitter-receiver unit 11 is configured to offer the particular service to the mobile station UE through the second radio data link, which is established between the mobile station UE and a cell (such as a cell 02) in the area B (a second area) in a state in which the first radio data link is not established between the mobile station UE and the cell in the area A.

Nevertheless, the transmitter-receiver unit 11 is configured to suspend the offer of the particular service through the second radio data link if the state in which the first radio data link is not established continues for a predetermined time period.

To be more precise, the transmitter-receiver unit 11 is configured to suspend the offer of the particular service through the second radio data link in response to the instruction from the communication judgment unit 12 when the timer controller 13 detects expiration of the timer used for counting.

Operation of Mobile Communication System According to First Embodiment of the Present Invention An operation of the mobile communication system according to the first embodiment of the present invention will be described with reference to FIG. 4 to FIG. 8.

Figure 4:
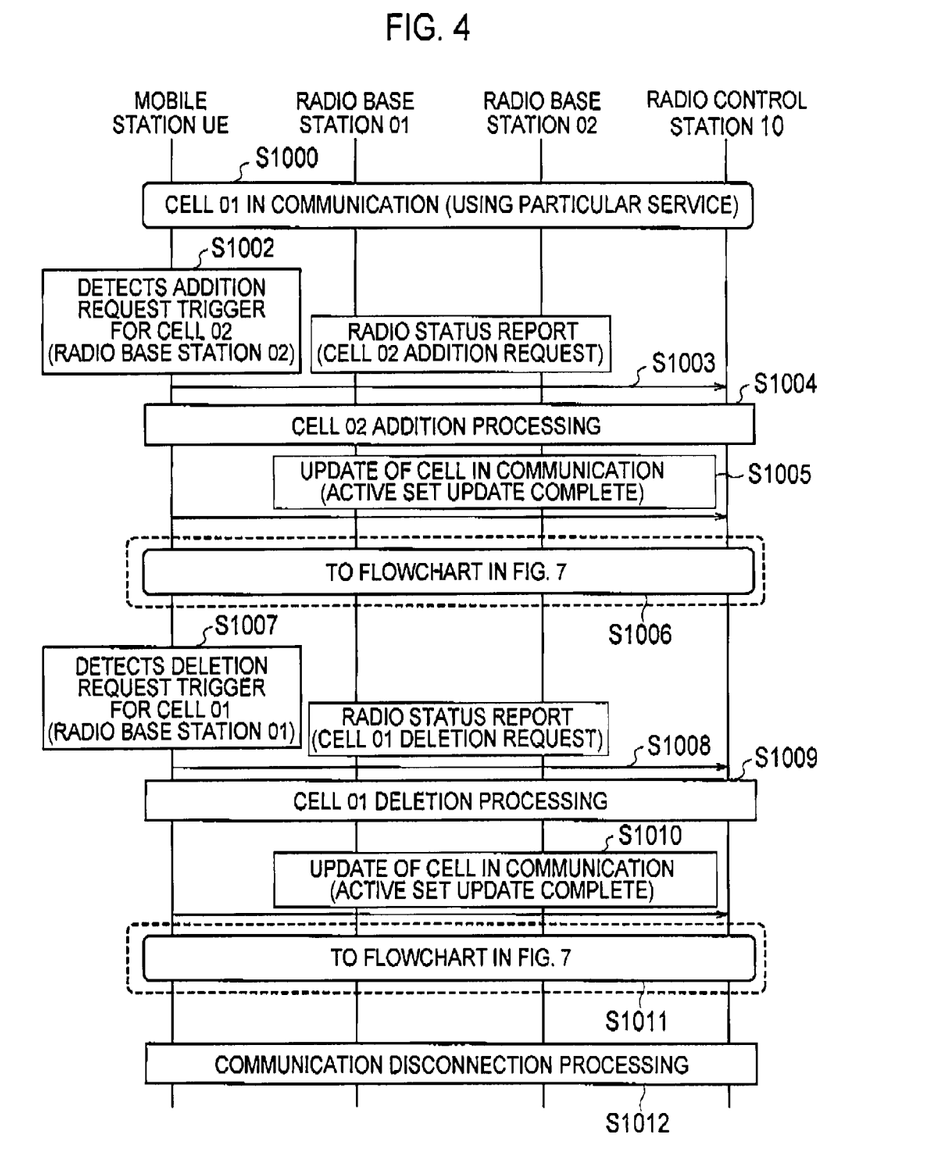
FIG. 4 is a sequence diagram showing an operation performed when changing a cell in communication in the mobile communication system according to the first embodiment of the present invention.

First, FIG. 4 is a sequence diagram showing an operation performed when changing a cell in communication in the mobile communication system according to the first embodiment of the present invention.

As shown in FIG. 4, in step S1000, the mobile station UE is using the particular service through the first radio data link established with the cell 01, which is under the control of the radio base station 01 in the area A.

When the mobile station UE detects an addition request trigger for a radio data link by using a given algorithm in step S1002 in a case, for example, where a radio communication environment with a cell 02 in the area B becomes favorable at the time of a movement or the like, the mobile station UE transmits an addition request (a radio status report) for the second radio data link with the cell 02 to the radio control station 10 in step S1003.

Since the cell 02 in the area B is allowed to offer the particular service, addition processing of the second radio data link between the mobile station UE and the cell 02 is performed in step S1004, whereby the mobile station UE is in a state of DHO communication.

Figure 7:
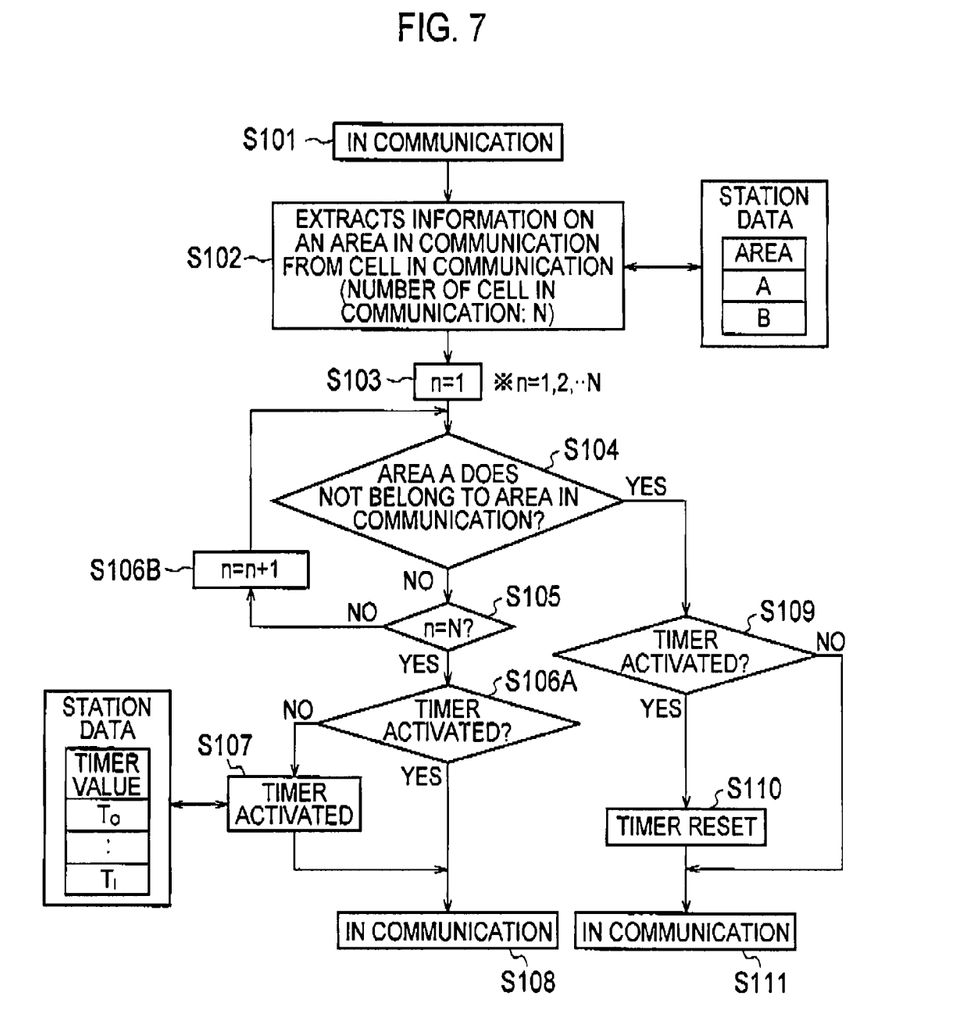
FIG. 7 is a flowchart showing an operation performed when changing the cell in communication in the radio control station according to the first embodiment of the present invention.

When updating of the cell in communication by the mobile station UE is notified in the form of "Active Set Update Complete" in step S1005, the radio control station 10 performs an operation shown in FIG. 7 in step S1006.

Figure 5:
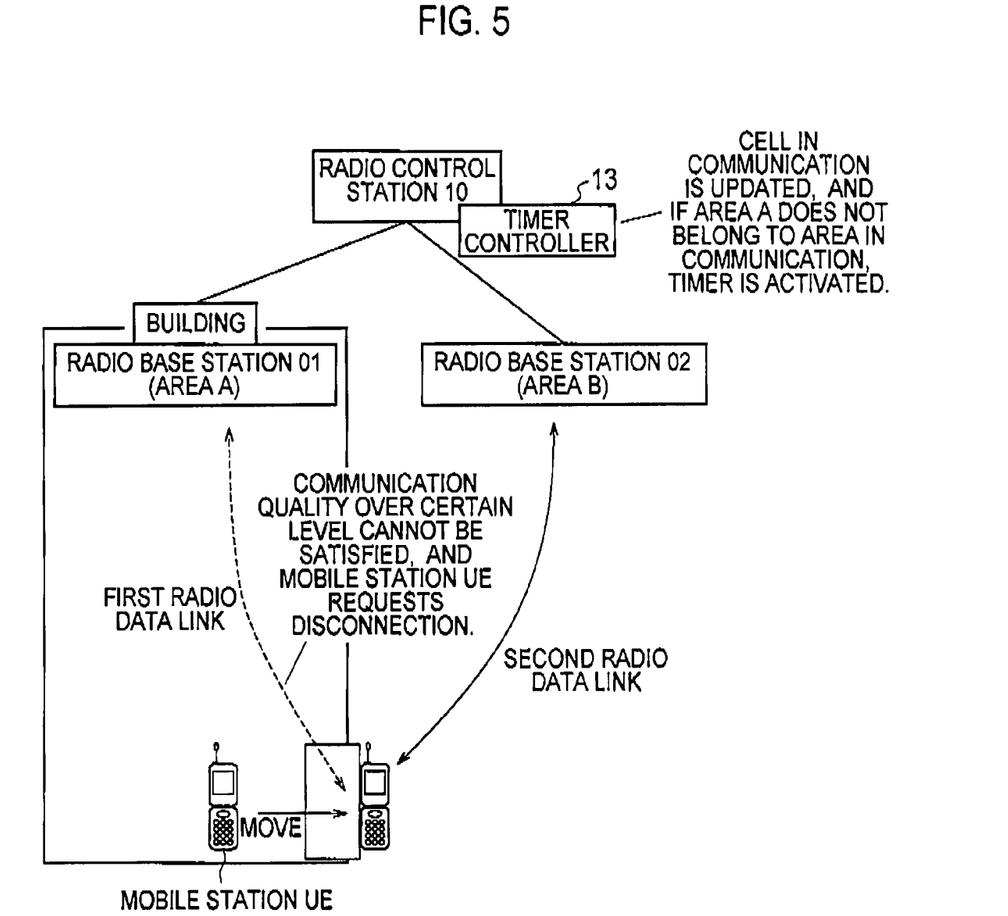
FIG. 5 is a view for explaining the operation performed when changing the cell in communication in the mobile communication system according to the first embodiment of the present invention.

When the mobile station UE detects a deletion request trigger for a radio data link by using a given algorithm in step S1007 in a case, for example, where a radio communication environment with the cell 01 in the area A becomes poor at the time of a movement or the like, the mobile station UE transmits a deletion request (a radio status report) for the first radio data link with the cell 01 to the radio control station 10 in step S1008 (see FIG. 5).

Figure 6:
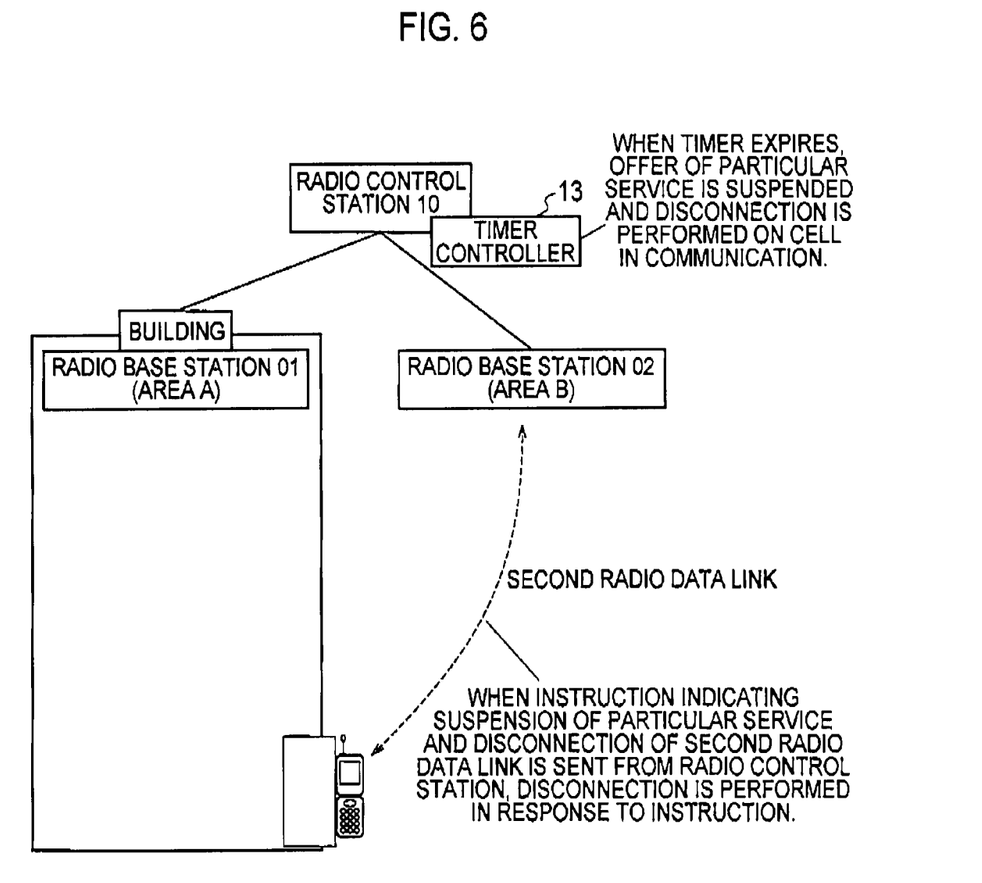
FIG. 6 is a view for explaining the operation performed when changing the cell in communication in the mobile communication system according to the first embodiment of the present invention.

In step S1009, deletion (disconnection) processing of the first radio data link between the mobile station UE and the cell 01 is performed (see FIG. 6).

When updating of the cell in communication by the mobile station UE is notified in the form of "Active Set Update Complete" in step S1010, the radio control station 10 performs the operation shown in FIG. 7 in step S1011.

Thereafter, if the state in which the first radio data link is not established between the mobile station UE and the cell 01 continues for a predetermined time period, deletion (disconnection) processing of the second radio data link between the mobile station UE and the cell 02 is performed in step S1012.

There is a rare case where, even if the mobile station UE is located in the area A or the area B, the mobile station transmits, due to a certain radio wave condition, an addition request for a radio data link with a cell in an area (which is not shown in the drawing but will be referred to as an area C for the sake of convenience), which is located further outside of the area B and not allowed to offer the particular service.

The radio control station 10 may be configured to dismiss such an addition request for a radio data link without exception, or may be configured to activate the timer and to disconnect the radio data link established by the mobile station UE after a lapse of a predetermined time period, even if there is communication ongoing between the mobile station UE and the cell in the area A through the first radio data link, upon occurrence of such an addition request for a radio data link.

A conceivable example of the case where there is the communication ongoing between the mobile station UE and the cell in the area A through the first radio data link established therebetween and the addition request for the radio data link with the cell in the area C is transmitted from the mobile station UE, is a condition in which the area A and the area C significantly interfere with the area B.

In this case, it is likely that the mobile station UE is displaced from the area A (the area identifiable as the area A) and located in the area B (the area not identifiable as the area A). Accordingly, as long as the area offering the service is limited to the area A, the radio control station 10 may be configured to disconnect the first radio data link by using the above-described timer.

Next, an operation of the radio control station 10 shown in FIG. 7 will be described.

As shown in FIG. 7, when the transmitter-receiver unit 11 of the radio control station 10 receives the "Active Set Update Complete" indicating completion of the addition processing or the deletion processing (the updating processing of the cell in communication by the mobile station UE) of the radio data link from the mobile station UE, the communication judgment unit 12 of the radio control station 10 extracts information (information on an area in communication) that indicates which area each of the updated cells in communication belongs to in step S102, based on the station data held by the station data holding unit 14.

Here, the communication judgment unit 12 can refer to the information on an area in communication stored in the station data holding unit 14 by using an address corresponding to the cell in communication. Such reference is made just for a frequency equal to the number N of cells in communication.

The communication judgment unit 12 adds 1 to an integer variable n ranging from 1 to N in step S103, and judges whether or not a first cell in communication belongs to the area A in step S104.

When a judgment is made that the above-mentioned cell in communication does not belong to the area A, the communication judgment unit 12 increments the variable n just by 1 and performs judgment processing of step S104 on a second cell in communication in step S106B.

The communication judgment unit 12 performs the judgment processing N times at the maximum. However, the communication judgment unit 12 terminates the judgment processing when discovering a cell in communication which belongs to the area A, and then the operation goes to step S109.

In step S109, the communication judgment unit 12 judges whether or not the timer controlled by the timer controller 13 is active. When judging that the timer is active, the communication judgment unit 12 resets the timer in step S110, and then the operation goes to step S111. When judging that the timer is not active, the communication judgment unit 12 does not reset the timer, and then the operation goes to step S111.

Here, a conceivable example of the case where the timer needs to be reset is a state in which the mobile station UE establishes the first radio data link again with the cell in the area A while the timer is active.

In step S111, the transmitter-receiver unit 11 of the radio control station 10 continues communication through the first radio data link established with the cell in the area A (the cell in communication).

On the other hand, if the communication judgment unit 12 cannot discover a cell in communication that belongs to the area A in spite of performing the judgment processing in step S104 N times, the communication judgment unit 12 judges whether or not the timer controlled by the timer controller 13 is active in step S106A. When judging that the timer is active, the communication judgment unit 12 activates the timer in step S110 by using timer values T0 to T1 defined by the station data holding unit 14, and then operation goes to step S108. When judging that the timer is not active, the communication judgment unit 12 does not activate the timer, and then the operation goes to step S108.

In step S108, the transmitter-receiver unit 11 of the radio control station 10 continues communication through the first radio data link established with the cell in the area A (the cell in communication).

Figure 8:
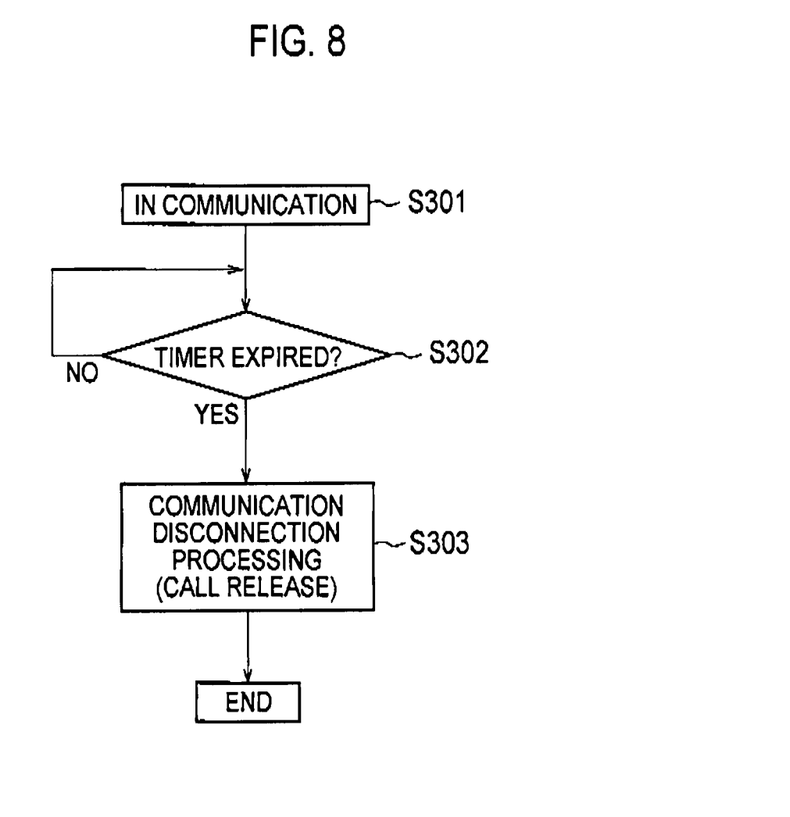
FIG. 8 is a flowchart showing an operation during communication of the radio control station according to the first embodiment of the present invention.

Meanwhile, as shown in step S302 in FIG. 8, the communication judgment 12 always monitors whether or not the timer expires. When detecting expiration of the timer, the communication judgment unit 12 performs communication disconnection processing in step S303.

Here, if the updating of the active cell occurs before expiration of the timer, the radio control station 10 performs the operation shown in FIG. 7 again.

Meanwhile, the radio control station 10 fails to discover the cell in communication belonging to the area A in step S104 and activates the timer in step S107. Here, a case will be considered in which the mobile station UE updates the cell in communication by moving to a place communicatable with the cell in the area A prior to expiration of the timer, and transmitting the addition request for the radio data link with the cell in the area A while taking the opportunity of improved communication quality with the cell in the area.

In this case, after receiving the "Active Set Update Complete" from the mobile station UE, the radio control station 10 discovers the cell in communication belonging to the area A by way of the operation shown in FIG. 7 (step S104), and resets the timer as described above in order to continue the communication concerning the particular service (step S110).

Accordingly, it is possible to delay disconnection of the communication concerning the particular service by using the timer depending on the situation. Specifically, it is possible to wait for establishment of the first radio data link between the mobile station UE and the cell in the area A while continuing the communication concerning the particular service by setting up the timer and delaying disconnection of the communication concerning the particular service.

Here, a period in which the communication concerning the particular service can be continued becomes longer as the timer value used in the active time is longer.

For example, in a place (in the area A) largely influenced by the area B, the communication quality between the mobile station UE and the cell in the area A tends to be deteriorated, whereby the radio data link established between the mobile station UE and the cell in the area A is apt to be deleted. Accordingly, by setting the long timer value to be used in the above-described timer, duration of the communication concerning the particular service can be extended and the area offering the particular service can be prevented from being narrowed down.

Meanwhile, in a place (in the area A) even more largely influenced by the area B, it is possible to turn the timer off using the timer value "0xff" and thereby to maintain broad coverage of the area offering the particular service without disconnecting the communication concerning the particular service by use of the timer.

On the other hand, when the area A (such as an indoor area) has a small influence from the area (such as an outdoor area), it is also possible to disconnect the communication concerning the particular service immediately by setting the time value to "0x00". Hence it is possible to avoid excessive expansion of the area offering the particular service.

Further, different timer values can be provided to the respective mobile stations UE depending on continuous talk time, cumulative talk time or the like. Hence a service in a coordinated fashion can be provided.

Second, an operation at a start of the communication of the mobile communication system according to this embodiment will be described with reference to FIG. 9 and FIG. 10.

Figure 9:
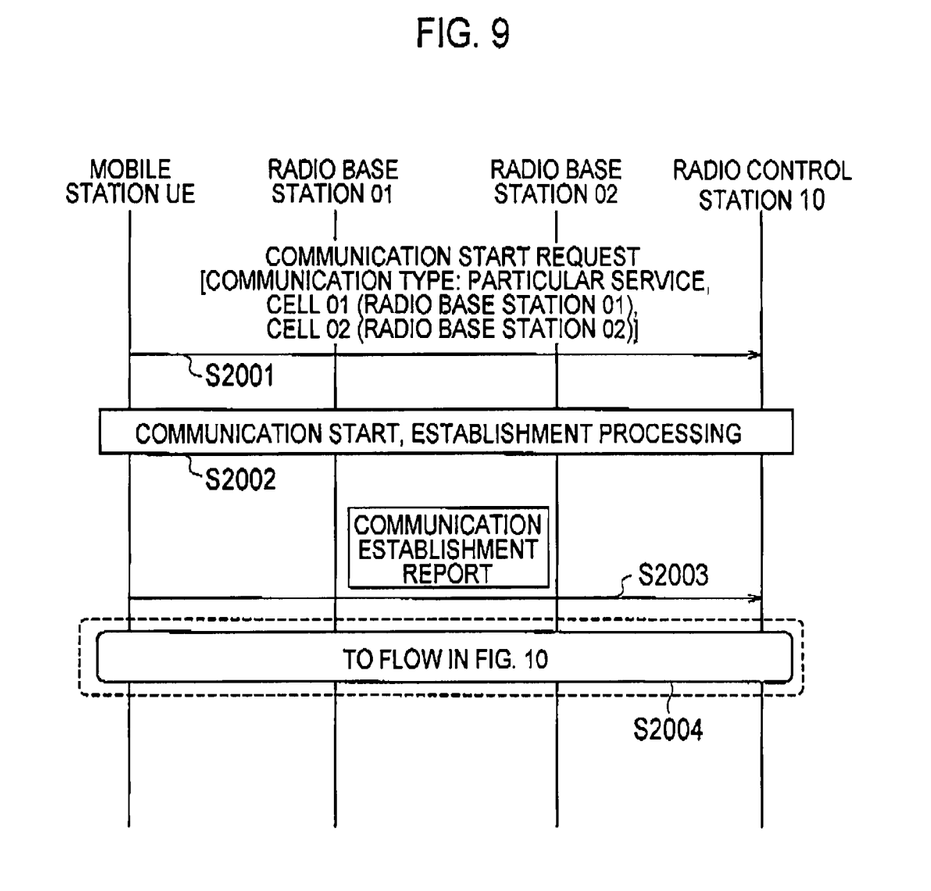
FIG. 9 is a sequence diagram showing an operation at a start of communication of the mobile communication system according to the first embodiment of the present invention.

As shown in FIG. 9, in step S2001, the mobile station UE transmits a communication start request to the radio control station 10 in order to use the particular service through the cell 01 (under the control of the radio base station 01) in the area A and the cell 02 (under the control of the radio base station 02) in the area B.

Both of the cell in the area A and the cell in the area B can offer the particular service to the mobile station UE. Therefore, processing to start the communication concerning the particular service and processing to establish the radio data links (the first radio data link and the second radio data link) for offering the particular service are executed in step S2002.

When the processing to start the communication concerning the particular service and the processing to establish the radio data links are completed, the mobile station UE transmits a communication establishment report indicating the fact to the radio device 10 in step S2003.

Figure 10:
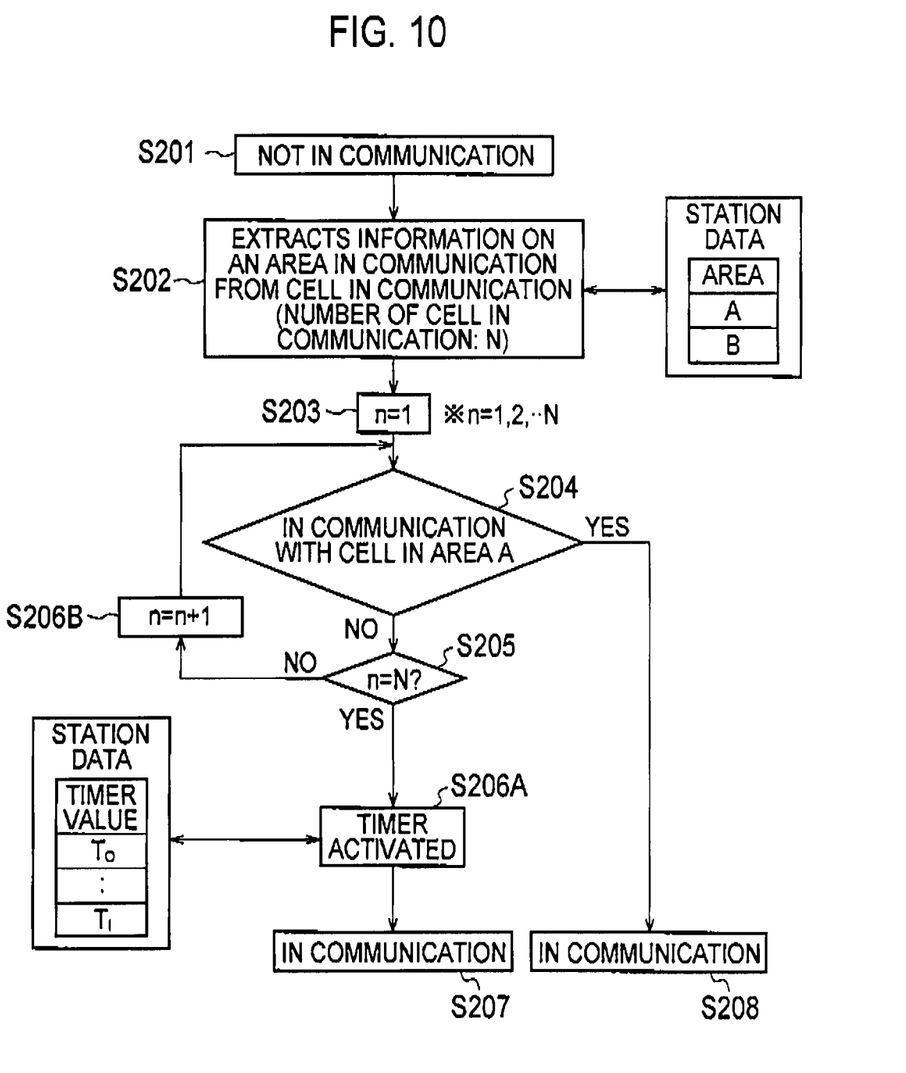
FIG. 10 is a flowchart showing the operation at the start of communication of the mobile communication system according to the first embodiment of the present invention.

In step S2004, the radio control station 10 performs an operation shown in FIG. 10. Now, the operation of the radio control station 10 shown in FIG. 10 will be described.

As shown in FIG. 10, when the transmitter-receiver unit 11 of the radio control station 10 receives the above-mentioned communication establishment report from the mobile station UE, the communication judgment unit 12 of the radio control station extracts information (information on an area in communication) that indicates which area each of the cells in communication having the radio data links established at the start of the communication belongs to, based on the station data held by the station data holding unit 14 in step S202.

Here, the communication judgment unit 12 can refer to the information on an area in communication stored in the station data holding unit 14 by using the address corresponding to the cell in communication. Such reference is made just for a frequency equal to the number N of cells in communication.

The communication judgment unit 12 adds 1 to an integer variable n ranging from 1 to N in step S203, and judges whether or not a first cell in communication belongs to the area A in step S204.

When judging that the above-mentioned cell in communication does not belong to the area A, the communication judgment unit 12 increments the variable n just by 1 and performs judgment processing of step S204 on a second cell in communication in step S206.

The communication judgment unit 12 performs the judgment processing N times at the maximum. However, the communication judgment unit 12 terminates the judgment processing when discovering a cell in communication which belongs to the area A, and then the operation goes to step S208.

In step S208, the transmitter-receiver unit 11 of the radio control station 10 continues the communication through the first radio data link established with the cell (the cell in communication) in the area A.

On the other hand, when discovering no cell in communication that belongs to the area A in spite of performing the judgment processing in step S204 N times, the communication judgment unit 12 activates the timer in step S206 by using the timer values T0 to T1 defined by the station data holding unit 14. Thereafter, in step S207, the transmitter-receiver 11 of the radio control station 10 continues the communication through the first radio data link established with the cell in the area A (the cell in communication).

After completion of the operation shown in FIG. 10, the radio control station 10 transits to a state to perform the operation shown in FIG. 4 in step S2004.

Operation and Effect of Mobile Communication System According to First Embodiment of the Present Invention According to the mobile communication system of the first embodiment of the present invention, it is possible to avoid pressure on a communication capacity of an area adjacent to an area offering a particular service and avoiding deterioration in a service performance attributable to a difference in a configuration of each area offering the particular service or a change of the area offering the particular service.

Mobile Communication System According to Second Embodiment of the Present Invention A mobile communication system according to a second embodiment of the present invention will be described with reference FIG. 11. In the following, the mobile communication system according to the second embodiment of the present invention will be explained mainly based on differences from the above-described mobile communication system according to the first embodiment.

In a mobile communication system of a "LTE (Long Term Evolution) scheme" which is currently studied for the 3GPP, planned is to introduce a radio base station eNodeB having combined capabilities of a conventional radio base station NodeB and a radio network control station RNC.

Moreover, according to the mobile communication system of the LTE scheme, there is a high possibility that the DHO is not implemented unlike the mobile communication system of the WCDMA scheme shown in FIG. 1 for simplified control.

Figure 11:
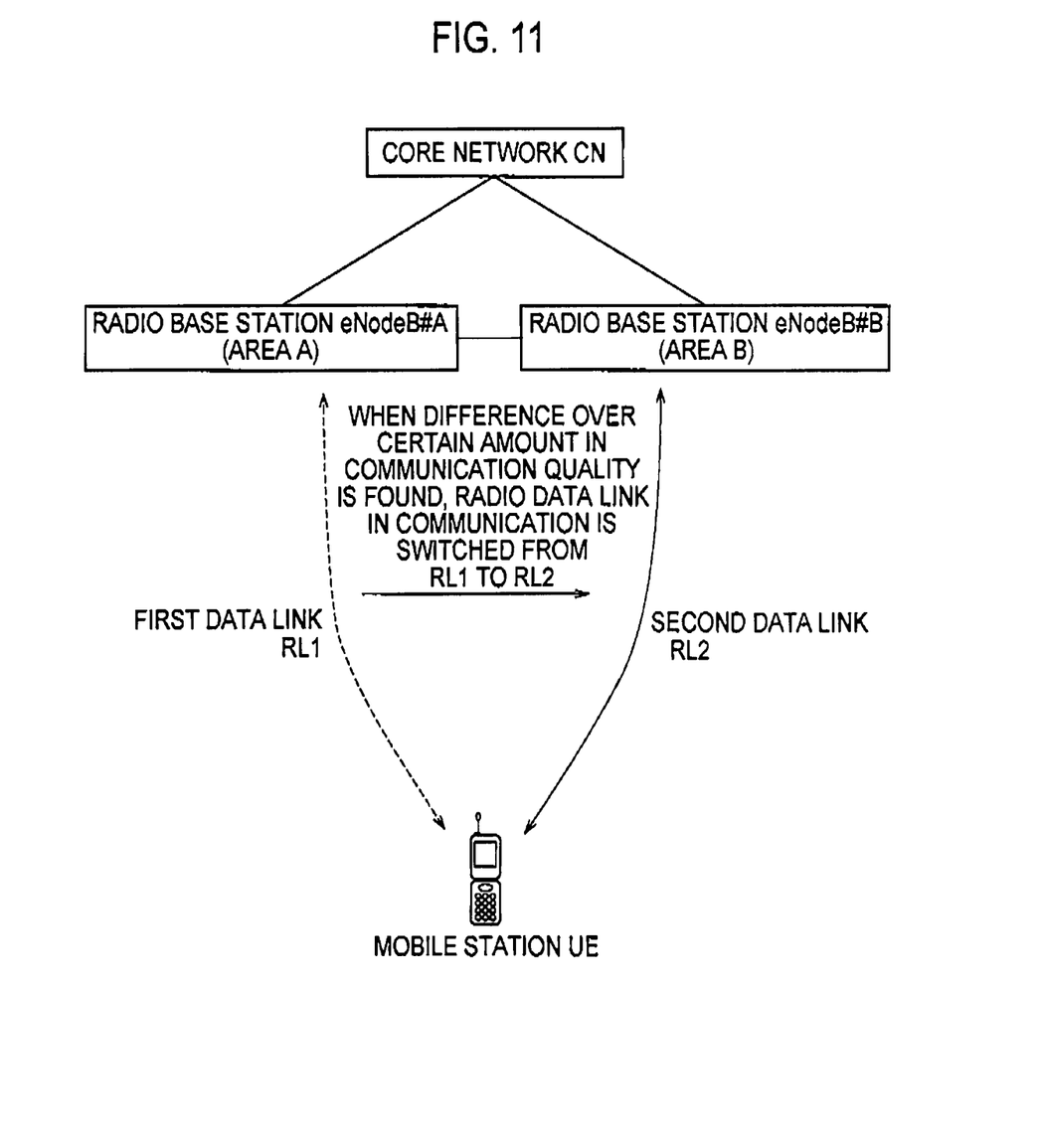
FIG. 11 is a view for explaining a mobile communication system according to a second embodiment of the present invention.

Instead, as shown in FIG. 11, a "HO (Hand Over)" that defines the number of the radio data line to be established by the mobile station UE always equal to "1" (The "HO (Hand Over)" is a system equivalent to "HHO (Hard Hand Over)" in the mobile communication system of the WCDMA scheme. The HHO in the mobile communication system of the WCDMA scheme performs frequency switching whereas the HO in the mobile communication system of the LTE scheme does not always perform frequency switching.) is implemented in the mobile communication system of the LTE scheme.

In the example of FIG. 11, a radio base station eNodeB#A is configured to manage a cell in the area A while a radio base station eNodeB#B is configured to manage a cell in the area B.

Now, an operation of the mobile communication system according to this embodiment will be described with reference to FIG. 11.

First, in the mobile communication system according to this embodiment, when communication quality between the mobile station UE and the cell under the control of the radio base station eNodeB#B (the cell in the area B) adjacent to the radio base station eNodeB#A becomes better than communication quality between the mobile station UE and the cell under the control of the radio base station eNodeB#A (the cell in the area A) which is currently communicating with the mobile station UE due to movement of the mobile station UE or the like, a new second radio data link RL2 is established between the mobile station UE and the cell under the control of the radio base station eNodeB#B (the cell in the area B) and a first radio data link RL1 established between the mobile station UE while the cell under the control of the radio base station eNodeB#A (the cell in the area A) is disconnected.

Here, in the state in which the first radio data link RL1 is not established, the offer of the particular service to the mobile station UE is continued by the radio base station eNodeB#B through the second radio data link RL2.

Meanwhile, upon disconnection of the first radio data link RL1, i.e. upon transition to the state in which the first radio data link RL1 is not established, the radio base station eNodeB#B activates the timer for counting a predetermined time period.

Second, when the state in which the first radio data link RL1 is not established continues for the predetermined time period, the radio base station eNodeB#B suspends the offer of the particular service through the second radio data link RL2.

To be more precise, the radio base station eNodeB#B suspends the offer of the particular service through the second radio data link RL2 when the above-described timer expires.

On the other hand, when the above-described first radio data link RL1 is established again prior to expiration of the timer while the second radio data link is disconnected because the communication quality between the mobile station UE and the cell in the area A becomes better than the communication quality between the mobile station UE and the cell in the area B (i.e., when the mobile station UE returns to the communication with the cell in the area A through the first radio data link), the radio base station eNodeB#B resets the above-described timer.

Here, the radio base station eNodeB#A may be configured to manage the above-described timer and to notify the radio base station eNodeB#B of an expiration of the timer.

Note that the operation of the radio control station 10, the mobile station UE and of the radio base station may be implemented by hardware, may be implemented by a software module that is executed by a processor, or may be implemented by combination of both.

The software module may be provided in any form of storage media including a RAM (Random Access Memory), a flash memory, a ROM (Read Only Memory), an EPROM (Erasable Programmable ROM), an EEPROM (Electronically Erasable and Programmable ROM), a register, a hard disc, a removable disc, and a CD-ROM.

Such a storage medium is connected to the processor so as to allow the processor to read or write information from or to the storage medium. Alternatively, the storage medium may be integrated in a processor. Furthermore, the storage medium and the processor may be provided in ASIC. The ASIC may be provided in the mobile station UE and the radio base station eNB. Instead, the storage medium and the processor may be provided in the mobile station UE and the radio base station eNB as discrete components.

As has been described so far, the present invention has been described in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2007-291009 (filed on Nov. 8, 2007) is incorporated herein by reference.

INDUSTRIAL APPLICABILITY

As has been described, since the present invention is able to provide a mobile communication method, a radio control station, and a radio base station, which are capable of avoiding pressure on a communication capacity of an area adjacent to an area offering a particular service and avoiding deterioration in a service quality attributable to a difference in a configuration of each area offering the particular service or a change of the area offering the particular service, they are useful.

The invention claimed is:

1. A mobile communication method for a mobile communication system having a first area and a second area, both areas offering a same particular service, comprising:
   a step A of offering the particular service through a second radio data link established between a mobile station and a cell in the second area in a state in which a first radio data link is not established between the mobile station and a cell in the first area;
   a step B of suspending the offer of the particular service through the second radio data link when the state in which the first radio data link is not established continues for a predetermined time period;
   a step C of activating a timer configured to count the predetermined time period when the first radio data link is not established at a start of communication concerning the particular service by the mobile station, wherein the offer of the particular service through the second radio data link is suspended in the step B when the timer expires; and
   a step D of resetting the timer when the first radio data link is established.

2. The mobile communication method according to claim 1, comprising a step of activating the timer when transition to the state in which the first radio data link is not established occurs in the course of the communication concerning the particular service.

3. The mobile communication method according to claim 1, wherein the particular service is a flat-rate communication service.

4. The mobile communication method according to claim 1, wherein the mobile station initially starts communication in the first area and then moves into the second area.

5. A radio control station used in a mobile communication system having a first area and a second area, both areas offering a same particular service, comprising:
   a particular service offering unit configured to offer the particular service through a second radio data link established between a mobile station and a cell in the second area in a state in which a first radio data link is not established between the mobile station and a cell in the first area,
   wherein the particular service offering unit is configured to suspend the offer of the particular service through the second radio data link when the state in which the first radio data link is not established continues for a predetermined time period; and
   a timer controller configured to activate a timer to count the predetermined time period when the first radio data link is not established at a start of communication concerning the particular service by the mobile station,
   wherein the particular service offering unit is configured to suspend the offer of the particular service through the second radio data link when the timer expires, and
   wherein the timer controller is configured to reset the timer when the first radio data link is established.

6. The radio control station according to claim 5, wherein the timer controller is configured to activate the timer when transition to the state in which the first radio data link is not established occurs in the course of the communication concerning the particular service.

7. A radio base station to be used in a mobile communication system having a first area and a second area, both areas offering a same particular service, comprising:
   a particular service offering unit configured to offer the particular service through a second radio data link established between a mobile station and a cell in the second area in a state in which a first radio data link is not established between the mobile station and a cell in the first area,
   wherein the particular service offering unit is configured to suspend the offer of the particular service through the second radio data link when the state in which the first radio data link is not established continues for a predetermined time period; and
   a timer controller configured to activate a timer to count the predetermined time period when the first radio data link is not established at a start of communication concerning the particular service by the mobile station,
   wherein the particular service offering unit is configured to suspend the offer of the particular service through the second radio data link when the timer expires, and
   wherein the timer controller is configured to reset the timer when the first radio data link is established.

* * * * *